(12) United States Patent
Jagadeesan et al.

(10) Patent No.: US 7,076,251 B2
(45) Date of Patent: Jul. 11, 2006

(54) SYSTEM AND METHOD FOR DELIVERING PRIVATE NETWORK FEATURES TO A PUBLIC NETWORK

(75) Inventors: Ramanathan T. Jagadeesan, San Jose, CA (US); Bich T. Nguyen, Los Altos, CA (US); Kamaldip Toor, San Diego, CA (US); Troy M. Trenchard, Los Gatos, CA (US); Sudhakar S. Valluru, San Jose, CA (US); Tony T. Wan, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 10/660,172

(22) Filed: Sep. 11, 2003

(65) Prior Publication Data

US 2005/0059402 A1    Mar. 17, 2005

(51) Int. Cl.
*H04Q 7/20*       (2006.01)

(52) U.S. Cl. ............... 455/445; 455/417; 455/560; 455/461; 370/331; 370/401; 370/352

(58) Field of Classification Search .......... 455/445, 455/417, 560, 461; 370/331, 401, 352
See application file for complete search history.

(56) References Cited

U.S. PATENT DOCUMENTS

| | | | |
|---|---|---|---|
| 5,577,029 A | 11/1996 | Lu et al. ............... | 370/54 |
| 5,887,256 A | 3/1999 | Lu et al. ............... | 455/426 |
| 5,943,332 A | 8/1999 | Liu et al. .............. | 370/342 |
| 6,002,679 A | 12/1999 | Liu et al. .............. | 370/335 |
| 6,016,318 A | 1/2000 | Tomoike ............... | 370/401 |
| 6,141,545 A | 10/2000 | Begeja et al. .......... | 455/417 |
| 6,181,928 B1 | 1/2001 | Moon ................... | 455/415 |
| 6,405,040 B1 | 6/2002 | Liu et al. .............. | 455/435 |
| 6,411,632 B1 | 6/2002 | Lindgren et al. ....... | 370/466 |
| 6,539,237 B1 | 3/2003 | Sayers et al. .......... | 455/555 |
| 6,546,425 B1 | 4/2003 | Hanson et al. ......... | 709/227 |

(Continued)

OTHER PUBLICATIONS

J. Rosenberg, "A Session Initiation Protocol (SIP) Event Package for Registrations," Network Working Group, RFC 3680, 22 pgs, Mar. 2004.

(Continued)

*Primary Examiner*—Doris H. To
*Assistant Examiner*—Sanh Phu
(74) *Attorney, Agent, or Firm*—Baker Botts L.L.P.

(57) ABSTRACT

A method is provided that includes receiving a request from a communication device to establish a communication session with a mobile station. The request is responded to by signaling the mobile station via a cellular data network that a call is being initiated for the mobile station. Signaling information may be exchanged with a voice gateway such that one or more voice circuits are established to accommodate voice data that may propagate between the communication device and the mobile station. A signaling pathway may be established between an Internet protocol private branch exchange (IP PBX) and the mobile station via the cellular data network. The establishment of the signaling pathway is substantially concurrent with the establishment of one or more of the voice circuits such that one or more features associated with a private network are delivered to the mobile station during the communication session.

32 Claims, 2 Drawing Sheets

U.S. PATENT DOCUMENTS

| | | | |
|---|---|---|---|
| 6,611,689 B1* | 8/2003 | Cartigny et al. | 455/461 |
| 6,647,426 B1 | 11/2003 | Mohammed | 709/238 |
| 6,687,360 B1 | 2/2004 | Kung et al. | 379/211.02 |
| 6,748,054 B1 | 6/2004 | Gross et al. | 379/88.12 |
| 6,771,953 B1 | 8/2004 | Chow et al. | 455/417 |
| 6,807,431 B1 | 10/2004 | Sayers et al. | 455/555 |
| 6,826,173 B1 | 11/2004 | Kung et al. | 370/352 |
| 6,888,808 B1 | 5/2005 | Jagadeesan et al. | 370/328 |
| 6,961,559 B1 | 11/2005 | Chow et al. | 455/414.1 |
| 2001/0046214 A1* | 11/2001 | Kang | 370/328 |
| 2003/0134638 A1 | 7/2003 | Sundar et al. | 455/435 |
| 2003/0134650 A1 | 7/2003 | Sundar et al. | 455/465 |
| 2003/0224795 A1 | 12/2003 | Wilhoite et al. | 455/445 |
| 2004/0037324 A1 | 2/2004 | Heubel et al. | 370/493 |
| 2004/0087307 A1 | 5/2004 | Ibe et al. | 455/436 |
| 2004/0127208 A1 | 7/2004 | Nair et al. | 455/420 |
| 2004/0146021 A1 | 7/2004 | Fors et al. | 370/331 |
| 2004/0266426 A1* | 12/2004 | Marsh et al. | 455/426.2 |

OTHER PUBLICATIONS

M. Garcia-Martin, E. Henrikson, and D. Mills, "Private Header (P-Header) Extensions to the Session Initiation Protocol (SIP) for the 3rd-Generation Partnership Project (3GPP)," Network Working Group, RFC 3455, 29 pgs, Jan. 2003.

Global System for Mobile Communications," 3rd Generation Partnership Project; Technical Specification Group Services and System Aspects; Report on alternative architectures for combining CS Bearers with IMS; Release 6," http://www.3gpp.org, 28 pgs, 2004.

* cited by examiner

SYSTEM AND METHOD FOR DELIVERING PRIVATE NETWORK FEATURES TO A PUBLIC NETWORK

TECHNICAL FIELD OF THE INVENTION

This invention relates in general to the field of communications and, more particularly, to a system and method for delivering private network features to a public network.

BACKGROUND OF THE INVENTION

Networking architectures have grown increasingly complex in communications environments. In addition, the augmentation of clients or end users wishing to communicate in various network environments has caused many networking configurations and systems to respond by adding elements to accommodate the increase in networking traffic and the various enhancements that have been provided by numerous communicative platforms. In recent years, a series of protocols and architectures have been developed in order to accommodate a diverse group of end users having various needs. For example, certain protocols may be used in a public environment, allowing an end user to conduct a communication session using a given communication device. Other protocols may provide an end user with the ability to function adequately in a private networking scenario, whereby a designated private network node may be accessed to provide a platform that the end user may use to conduct a communication session.

As both public and private network systems grow in size and in sophistication, proper routing and efficient management of communication sessions and data flows becomes even more critical. In cases where protocols are unable to accommodate a given service or feature, an end user is precluded from enjoying the benefits of a given communication architecture. Accordingly, the ability to provide an effective mechanism to properly process and direct communications for an end user seeking to realize the benefits provided by multiple network environments offers a significant challenge to network operators, component manufacturers, and system designers.

SUMMARY OF THE INVENTION

From the foregoing, it may be appreciated by those skilled in the art that a need has arisen for an improved communications approach that provides for more appropriate protocol integration procedures in offering optimal services and capabilities to an end user. In accordance with one embodiment of the present invention, a system and a method for delivering private network features in a public network are provided that greatly reduce disadvantages and problems associated with conventional data management techniques.

According to one embodiment of the present invention, there is provided a method for delivering private network features that includes receiving a request from a communication device to establish a communication session with a mobile station. The request is responded to by signaling to the mobile station over a cellular data network that a call is being initiated. Signaling information may be exchanged with a voice gateway after receiving the request such that one or more voice circuits are established by the voice gateway in order to accommodate voice data that may propagate between the communication device and the mobile station. A signaling pathway may also be established between an Internet protocol private branch exchange (IP PBX) and the mobile station via the cellular data network in response to the request. The establishment of the signaling pathway is substantially concurrent with the establishment of one or more of the voice circuits such that one or more features associated with a private network are delivered to the mobile station during the communication session.

Certain embodiments of the present invention may provide a number of technical advantages. For example, according to one embodiment of the present invention a communications approach is provided that allows for a greater number of services and capabilities to be provided to an end user. This is a result of the integration of public and private networking features that may be realized at a single location (e.g. a mobile station). Such an integration results in an end user being able to benefit from the architectures of two communication platforms. Moreover, a given end user does not have to sacrifice processing time or inhibit his own versatility in being able to enjoy the advantages of multiple networking systems. Furthermore, a given call may originate in the private network or the public network: the call being originated or received by the mobile station being implicated in the communication session.

Another technical advantage associated with one embodiment of the present invention is the result of the architecture of a given mobile station within the architecture. The mobile station is capable of providing services and features of both private and public networks to end users in real-time. The mobile station may also consume minimal battery resources, which extends the battery life for the mobile station. These performance enhancements may be attained in a seamless fashion such that an end user of a given communication device may have information displayed to him in a manner consistent with that of an enterprise network. The mobile station may realize these benefits without having to be upgraded in certain embodiments.

Yet another technical advantage associated with one embodiment of the present invention is the result of the configuration of the architecture, which provides for minimal overhead to be incurred in order to enhance a given communication system. A communication system can be readily upgraded to accommodate the operations and functionalities provided by multiple network architectures. Thus, an example implementation could be applicable to legacy systems where such features would be beneficial to a given group of end users. Moreover, numerous systems and architectures could be enhanced to accommodate such a networking protocol without inhibiting the performance of either the public or the private network systems. Mobile stations do not necessarily need to be equipped with any enhanced features or capabilities. Moreover, any of the functionalities provided by the private network could be readily implemented with a feature server, which may be included in an Internet protocol public branch exchange (IP PBX) or provided external thereto. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
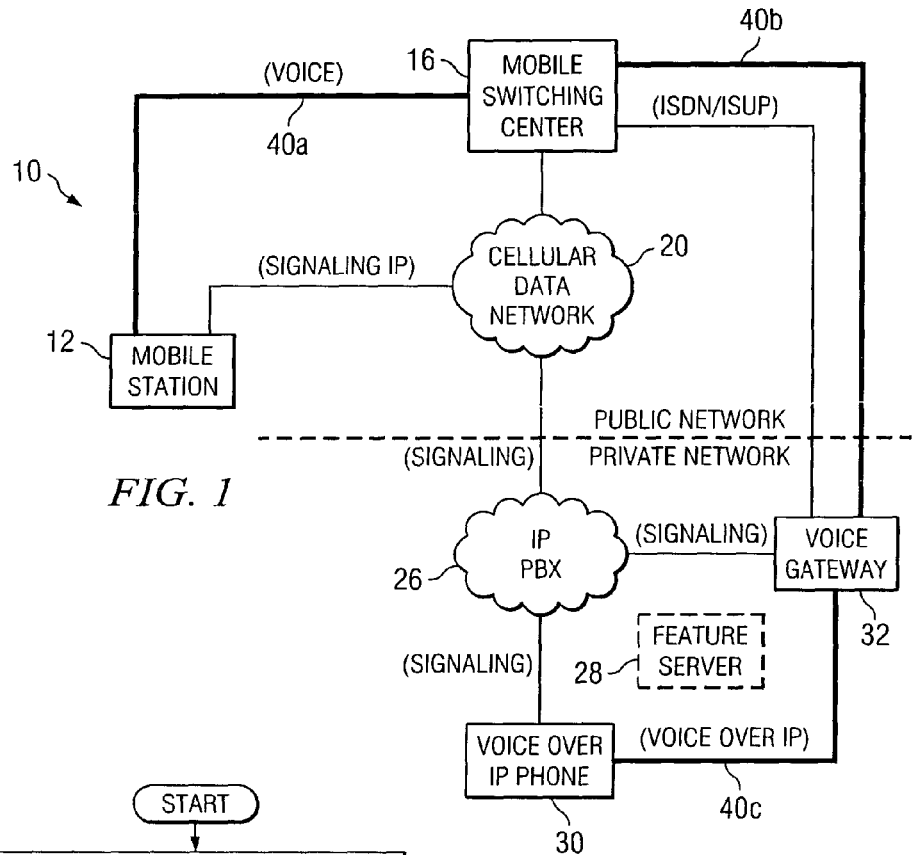
FIG. 1 is a simplified block diagram of a communication system for delivering private network features in a public network in accordance with one embodiment of the present invention.

FIG. 1 is a simplified block diagram of a communication system 10 for delivering private network features in a public network environment. Communication system 10 may include a mobile station 12, a mobile switching center (MSC) 16, a cellular data network 20, an Internet protocol private branch exchange (IP PBX) 26, and/or a feature server 28, which is shown in a hatched box. Feature server 28 may be used to provide any one or more of the functionalities of IP PBX 26, as described in more detail below. Communication system 10 may also include a voice over IP (VoIP) phone 30 and a voice gateway 32. Communication system 10 may additionally include a plurality of communication links 40a–c, which may facilitate the delivery of voice data between VoIP phone 30, voice gateway 32, MSC 16, and mobile station 12. A public and a private network, as delineated by a dashed line in FIG. 1, may cooperate in the architecture of communication system 10 in order to deliver the benefits of both networks to mobile station 12 as described more fully below.

FIG. 1 may be generally configured or arranged to represent a 2.5G communication architecture applicable to a Global System for Mobile (GSM) environment in accordance with one embodiment of the present invention. However, the 2.5G architecture is offered for purposes of example only and may alternatively be substituted with any suitable networking protocol or arrangement that provides a communicative platform for communication system 10. For example, communication system 10 may operate with any type of code-division multiple access (CDMA) architecture or cooperate with any version of a general packet radio service (GPRS) tunneling protocol (GTP) that includes a platform for executing data management operations. This may be inclusive of first generation, 2G, and 3G architectures that deliver a service or a capability to one or more clients or end users.

In accordance with the teachings of the present invention, communication system 10 provides a data coordination scheme that allows for the ability of an enterprise communication system to deliver private network functionalities to mobile station 12, while it operates in a public wireless network. Mobile station 12 may use a public wireless protocol (e.g. GSM or CDMA) for voice transport and a public wireless data protocol such as GPRS, enhanced data GSM environment (EDGE), universal mobile telecommunications service (UMTS), short message service (SMS), multi-media messaging (MMS), 1xRTT, 1xEV-DO, or 1xEV-DV, etc. for voice signaling. This provides for a "traditional" voice connection over the wireless voice network and an enhanced signaling channel over a given wireless data network.

The configuration of communication system 10 allows the enterprise system to establish a voice path between the private and public network using a voice network (e.g. via links 40a–c). Communication system 10 may also establish a separate signaling path (e.g. via cellular data network 20). The separate signaling path may enable enhanced signaling to deliver private network information to mobile station 12 by establishing a data connection from IP PBX 26 and mobile station 12 (via cellular data network 20). Thus, while in the public wireless network, mobile station 12 is able to receive private network PBX features (e.g. shared lines, call pickup, group pickup, directory functions, message waiting indicator, etc.) as if mobile station 12 were part of IP PBX 26 in the private network. This allows the enterprise system to provide a common set of private network features to mobile station 12 regardless of whether mobile station 12 receives service from the private or public network.

Accordingly, communication system 10 offers a greater number of services, features, and capabilities to an end user of mobile station 12. This is a result of the integration and delivery of public and private networking features. Additionally, a given end user does not sacrifice processing time or inhibit his own versatility in being able to enjoy the advantages of both systems. In addition, minimal overhead is incurred as a result of a modification to a given system in order to accommodate private and public network functions. Any communication architecture can be readily upgraded to accommodate the features of both public and private systems. The benefits of the architecture of communication system 10 may be realized by mobile station 12 having an enhanced dual-mode functionality, or equally realized by mobile station 12 in scenarios where no enhancements to its architecture are performed. The display of information at mobile station 12 (e.g. images, arrangements, etc.) can be provided to an end user in a manner that is consistent with representations offered in the enterprise domain.

It is important to note that a given call may originate in the private network or the public network. In addition, the call may be originated or received by mobile station 12, which is being implicated in the communication session. Calls may be properly anchored in the private network in order to achieve some of these operations.

In operation of an example embodiment used for purposes of teaching only, a call may be initiated by VoIP telephone 30 to mobile station 12. Signaling information may be exchanged over a link that couples IP PBX 26 and VoIP phone 30. IP PBX 26 is able to recognize that a call is being established that involves a given mobile unit (i.e. mobile station 12). Note that mobile station 12 may be equipped or enhanced such that it possesses dual-function capabilities. Alternatively, mobile station 12 may not be equipped for dual-function operations and yet still be fully operational in the context of communication system 10.

Signaling may be initiated with mobile station 12 over cellular data network 20 that a call is being constructed. This signaling function may be part of IP PBX 26, or may reside in a separate feature server. Accordingly, signaling information (e.g. call-control information) may be exchanged between IP PBX 26 and mobile station 12, whereby cellular data network 20 can readily accommodate the communication session. IP PBX 26 may also send caller-identification information over cellular data network 20 or, alternatively, IP PBX 26 may send any other suitable enterprise data sought to be passed through to cellular data network 20. As the signaling information is being exchanged between IP PBX 26 and mobile station 12 over cellular data network 20, IP PBX 26 may also exchange signaling information with voice gateway 32. Thus, voice circuits (e.g. time-division multiplexing (TDM)) are established between voice gateway 32 and MSC 16 over communications link 40b. This provides a voice pathway for voice data to be exchanged between mobile station 12 and VoIP phone 30.

Note that from a high-level perspective, the call illustrated through voice gateway 32 and to MSC 16 offers a media path, whereby signaling features are provided via cellular data network 20. The private network features provided to an end user of mobile station 12 may include, but are not limited to, a "hold" function, a conference call function, a mute function, a voice mail function, a do not disturb function, a three-way call function, a message alert function, a call forwarding function, a call waiting function, and a directory function. Note also that the voice connection may not necessarily need to be established until an end user decides to execute some task or to initiate some operation. In addition, IP PBX 26 does not utilize any signaling information in the path of voice gateway 32. For example, if the "hold" function is invoked, then it may be fully supported via cellular data network 20.

Once the call-control path has been established or the call-control transaction has been completed, IP PBX 26 may place a cellular call to mobile station 12 for the purpose of bringing up a media stream. Mobile station 12 includes intelligence operable to react to call-control information being communicated by cellular data network 20. The intelligence is further capable of coordinating that transaction with the cellular call that is coming in via one or more voice circuits. In a general sense, this allows mobile station 12 to realize the benefits of operating in both a private and a public network by effectively managing data exchanges and signaling information associated with the communication session.

The cellular call may be presented to a given end user in a way that is consistent with an enterprise call. This allows mobile station 12 to achieve the benefits of an enterprise (or private) network, while maintaining its existing capabilities in the public network environment. For example, once a call has been established a given end user of VoIP phone 30 can invoke a "hold" feature. The initiation of the "hold" functionality may be communicated to IP PBX 26, which again may be able to recognize that this communication session implicates mobile station 12, which has enhanced capabilities to realize operational functions in both private and public networks. IP PBX 26 may again exchange call-control signaling with mobile station 12 over cellular data network 20. Cellular data network 20 may signal (or "ping") the user interface of mobile station 12 in order to place mobile station 12 into a "hold" mode. The "hold" mode representation to an end user may reflect images, arrangements, and or protocols that are consistent with what is available in the enterprise network.

In operation of the reverse direction (again offered for purposes of example and teaching only), mobile station 12 may initiate a "hold" functionality by depressing a given key provided thereon. The request may propagate over cellular data network 20 to IP PBX 26. IP PBX 26 may then invoke the "hold" functionality in VoIP phone 30. IP PBX 26 may then remain responsible for managing the media that is consistent with the media handling capabilities as provided in the VoIP network in this example scenario.

Mobile station 12 is a wireless handset in accordance with a particular embodiment of the present invention, which includes intelligence that is capable of facilitating private networking features in a public network environment. This duality capability is described in greater detail below with reference to FIG. 2, which provides one example architecture of mobile station 12 that may be used to effectuate the operations thereof. In other embodiments, mobile station 12 is a standard device that is capable of receiving the features and services available in both a public and a private network: without having any enhancements being provided to its internal structure.

Alternatively, mobile station 12 may generically represent an end user, a client, or a customer wishing to initiate a communication session in communication system 10 via cellular data network 20 or IP PBX 26. Mobile station 12 may also be inclusive of other suitable devices used to initiate a communication session, such as a computer, a personal digital assistant (PDA), a laptop or an electronic notebook, a telephone, a mobile terminal, or any other device, component, element, or object capable of initiating voice or data exchanges within communication system 10. Mobile station 12 may also be inclusive of a suitable interface to the human user, such as a keypad, a microphone, a display, a keyboard, or other suitable terminal equipment. Mobile station 12 may also be any device that seeks to initiate a communication session on behalf of another entity or element, such as a program, a database, or any other component, device, element, or object capable of initiating a voice or a data exchange within communication system 10. Data or information, as used herein in this document may refer to any type of numeric, voice, video, audio-visual, or script data, or any type of source or object code, or any other suitable information in any appropriate format that may be communicated from one point to another.

MSC 16 is a network element that operates as an interface between mobile station 12 and voice gateway 32 (i.e. via a public-switched telephone network (PSTN)). MSC 16 may also be coupled to cellular data network 20. In alternative embodiments, MSC 16 may be replaced with any suitable access point operable to serve as a conduit for voice data, which propagates to or from mobile station 12. MSC 16 may also communicate with various other pieces of networking equipment in order to facilitate communications involving mobile station 12. For example, MSC 16 may communicate with radio access network (RAN) equipment (potentially inclusive of a base station controller and a base transceiver station).

It is important to note that, based on any given communication scheme or architecture, any number of additional alternative components may also be used to facilitate communications involving mobile station 12. Elements such as a serving general packet radio service (GPRS) support node (SGSN), a data gateway, and a gateway GPRS support node (GGSN) may readily be used to facilitate the operations of mobile station 12. Other applications may include the use of a PSTN, a packet-switched data network (PSDN), an access gateway, a wireless local area network (WLAN), an IP network, a network access server (NAS), a virtual private network (VPN) server, or any other suitable networking equipment operable to facilitate the operations of communication system 10 as described herein.

Mobile switching center 16 represents a location that generally houses communication switches and computers and ensures that its cell sites in a given geographical area are connected. Cell sites refer generally to the transmission and reception equipment or components, potentially including a number of suitable base stations that connect elements such as mobile station 12 to a network. By controlling transmission power and radio frequencies, mobile switching center 16 may monitor the movement and the transfer of a wireless communications from one cell to another cell and from one frequency or channel to another frequency or channel. Mobile switching center 16 may also generally handle connection, tracking, status, billing information, and other user information for wireless communications in a designated area. This may include, for example, the fact that mobile station 12 is assigned certain wireless capabilities or use time: most likely based on a given fee schedule associate with a given mobile network (e.g. cellular data network 20).

Cellular data network 20 represents a series of points or nodes of interconnected communication paths for receiving and transmitting packets of information that propagate to or from mobile station 12. A subscription or an agreement may be provided by cellular data network 20 to offer cellular service to an end user of mobile station 12. Cellular data network 20 provide a pathway for exchanging signaling information between IP PBX 26 and mobile station 12 such that enterprise features are delivered to mobile station 12 concurrently with features provided in a public network environment. Cellular data network 20 offers a communicative interface between mobile station 12 and any suitable location within or external to communication system 10 and may be representative of a GPRS service provider or any suitable local area network (LAN), WLAN, metropolitan area network (MAN), wide area network (WAN), VPN, or any other appropriate architecture or system that facilitates communications in a network environment. Cellular data network 20 may implement a user datagram protocol (UDP)/ Internet protocol (UDP/IP) communication language protocol in a particular embodiment of the present invention. Communication system 10 may utilize any form of transmission control protocol (TCP)/IP, or alternatively implement any other suitable communications protocol for transmitting and receiving data or information within communication system 10.

IP PBX 26 is a network component that resides in a private network and that facilitates communications involving mobile station 12 regardless of the network in which mobile station 12 operates. This function provides a communication path and an ability to establish a connection with mobile station 12 in order to properly accommodate the activities of an end user thereof. In accordance with a particular embodiment of the present invention, IP PBX 26 includes software operable to execute these operations. Alternatively, other elements could be used or substituted within the architecture of IP PBX 26, where appropriate, in order to address particular configuration needs. For example, any of the elements included within IP PBX 26 may be provided in any suitable hardware, processor, application program interface (API), application specific integrated circuit (ASIC), object, module, algorithm, or provided in any other suitable element based on particular communication needs. In certain applications or environments, any one or more of the functionalities of IP PBX 26 may be provided external thereto (e.g. within feature server 28). The elements included in IP PBX 26 (or provided external thereto) may be reflective of accommodations being made for a particular type of communications protocol or plan, a distributed architecture, or based on selected performance or service parameters.

In accordance with another embodiment of the present invention, feature server 28 may be used to execute one or more of the functions provided by IP PBX 26. In still another embodiment, feature server 28 may be provided within IP PBX 26 as a separate component or module, which is operable to provide a communication path and an ability to establish a connection with mobile station 12 in order to properly accommodate the activities of an end user thereof. IP PBX 26 may simply invoke feature server 28 in order to achieve dual-network benefits that are realized by mobile station 12. Thus, IP PBX 26 may cooperate with feature server 28, operate independent of feature server 28, or feature server 28 may operate without the assistance of IP PBX 26 in order to achieve the benefits of private and public networking.

VoIP phone 30 is a communication device that exists in a private network and that seeks to establish a communication session with mobile station 12. In other embodiments, VoIP phone 30 may be replaced with any other suitable communication device such as: a computer, a PDA, a laptop or an electronic notebook, a telephone (potentially coupled to a video conference bridge), a mobile station, or any other device, component, element, or object capable of initiating voice or data exchanges within communication system 10. The VoIP designation has been used for purposes of example only in providing one communication arrangement for discussion purposes. The VoIP protocol may be replaced with any suitable communication platform based on particular configuration needs. VoIP phone 30 may be replaced with any device, which may exist in the public network (e.g. a PSTN telephone, a cellular telephone, etc.).

Voice gateway 32 is a network node capable of facilitating voice exchanges involving mobile station 12. Voice gateway 32 may receive signaling information from IP PBX 26 after IP PBX 26 receives a request to establish a call initiated by VoIP phone 30. Voice gateway 32 may set-up a number of voice circuits (representative of a voice pathway) after receiving such signaling information: the voice pathway extending between voice gateway 32 and MSC 16, via a given PSTN. Additionally, in certain scenarios, an integrated services digital network/integrated services user part (ISDN/ISUP) link may be established between MSC 16 and voice gateway 32. Alternatively, such a link may be replaced with any suitable connection or coupling that facilitates a data exchange that may assist in any call involving mobile station 12. Voice gateway 32 includes software that is operable to accommodate the dual-functionality being provided to mobile station 12. Alternatively, the software provided in voice gateway 32 may be replaced with any suitable hardware, component, element, API, ASIC, module, or object operable to achieve the operations of voice gateway 32. In still other embodiments, these elements may be provided external to voice gateway 32.

Figure 2:
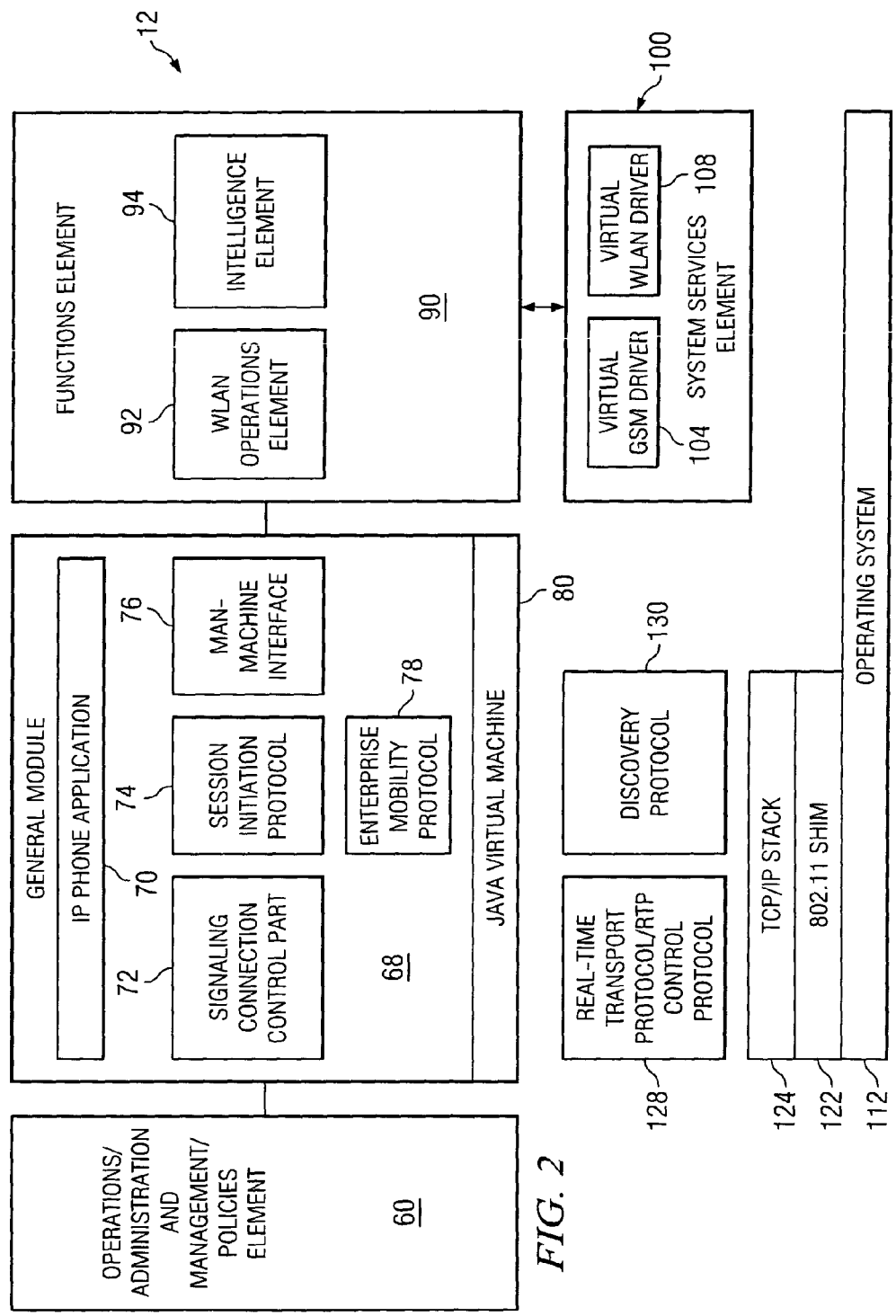
FIG. 2 is a simplified block diagram of an example architecture that may be provided in a mobile station, which may be included in the communication system in accordance with one embodiment of the present invention.

FIG. 2 is a simplified block diagram of one example architecture associated with mobile station 12. It is critical to note that the benefits of private and public networking may be realized by a single mobile station 12 that does not have any dual-mode capabilities. The description provided below is with reference to a given mobile station having such capabilities, but such an internal structure is not necessary. FIG. 2 simply offers one example embodiment of mobile station 12, which encompasses one or more dual-mode functionalities. It is also important to note that the arrangement and configuration of the elements in FIG. 2 has been offered for purposes of teaching only. Various items may be replaced, provided external to mobile station 12, or removed entirely from the architecture of mobile station 12. Moreover the elements that may be included in mobile station 12 may be reflective of accommodations being made for a particular type of communications protocol or based on selected performance parameters. Other elements could be added to such an architecture where appropriate in order to address some of these concerns, which may be in accordance with particular needs. It is critical to note the any of the elements identified below may be provided in any suitable software, hardware, processor, API, ASIC, object, module, algorithm, or provided in any other suitable element where appropriate and based on particular communication protocols or architectures.

In general, mobile station 12 may support multiple different communication modes, such as 802.11 and cellular protocols, and may support multiple different communication platforms, such as session initiation protocol (SIP) and H.323 (as described more fully below). For automatic support of multiple protocols, mobile station 12 may execute multiple call-control modules: each supporting a separate protocol with an abstraction layer providing a wrapper around the call-control modules. During operation, the abstraction layer may pass received signaling information to the appropriate call-control module. In order to support multiple communication modes, mobile station 12 may integrate protocol stacks, such as the 802.11 and cellular stacks for example, using a common interface. Thus, in one example scenario, an API may provide access to roaming and scanning functions of 802.11, while also providing access to power management and other cellular roaming and control functions.

Mobile station 12 may include an operations/administration (OA) and management/policies (MP) element 60 that is coupled to a general module 68, which includes an IP phone application 70, a signaling connection control part (SCCP) 72, a session initiation protocol 74, a man-machine interface (MMI) 76 (e.g. a graphical user interface (GUI)), and an enterprise mobility protocol 78. A JAVA virtual machine (VM) 80 may serve as a basis for these elements.

Mobile station 12 may also include a functions element 90 that includes a WLAN operations element 92 and an intelligence element 94. Functions element 90 may exchange information with a virtual GSM driver 104 and a virtual WLAN driver 108, which are provided within a system services element 100. System services element 100 may utilize a given operating system 112, which may couple to an 802.11 shim 122 that is coupled to a TCP/IP stack 124. As illustrated in FIG. 2, a real-time transport/RTP control protocol (RTCP) 128 and a discovery protocol 130 may also be provided in mobile station 12. Note that in certain configurations, mobile station 12 could be equipped with wireless WAN component: some or all of which may replace the WLAN components described herein. Such a scenario may be appropriate in cases where mobile station 12 does not have any enhanced capabilities and represents a standard wireless handset that is able to receive the benefits of private and public networking.

Mobile station 12 offers flexibility in enabling the coordination of data communications from two different networks in a single unit. In a general sense, the call-control information may be abstracted in order to provide a stack-switching capability (dynamically) in order to achieve the benefits of a private and a public network. Mobile station 12 may include intelligence that identifies and understands both data streams from both the private and public environment. Mobile station 12 is further able to take information from IP PBX 26 and map it to the voice information being communicated from the public network.

In operation, OA and MP element 60 provides provisioning operations for mobile station 12. For example, for a given handset various security characteristics and policies (e.g. numerous parameters associated with a VPN can be addressed via call processing), profile information (e.g. behavior of the phone inclusive of end user notification and tracking), and network parameters (e.g. potentially relating to speed, quality of service (QoS), etc.) may be assigned or provided to mobile station 12. Other policies to be accommodated by OA and MP element 60 may include verification of a path based on an arbitrary rate plan. Such policies could be dynamically controlled remotely or be locally controlled based on particular needs. Additionally, a number of radio parameters may also be addressed by OA and MP element 60, including appropriate power levels, proper legal channels in which the end user can operate, optimal data rates, etc. Roaming parameters may also be accommodated and relate to various networking thresholds (e.g. signal strength [comparing one versus another] and channel utilization that examines the bandwidth being consumed).

IP phone application 70, SCCP 72, SIP 74, MMI 76, and enterprise mobility protocol 78 cooperate in order to provide a common approach to performing a number of operations within mobile station 12 (e.g. placing a call on "hold," answering a call, etc.). The elements function to provide a seamless transition to various functionalities offered by a given network to mobile station 12. These elements provide a platform from which an end user can access both enterprise and public network functions. Enterprise mobility protocol 78, which may be a seamless server-specific protocol, may be running as one of the contexts in JAVA VM 80. Enterprise mobility protocol 78 may communicate to a server that is associated with IP PBX 26. In a general sense, enterprise mobility protocol 78 operates to announce that it may be entering the Wi-Fi network and may also investigate what can be done for mobile station 12.

RTP/RTCP 128 is a basic streaming protocol that facilitates data exchanges including mobile station 12. Discovery protocol 130 is a layer-two protocol that provides a broadcasting function for mobile station 12 such that a network can recognize mobile station 12. Note that mobile station 12 is capable of providing services and features of both private and public networks to end users in real-time. Mobile station 12 also consumes minimal battery resources and can extend battery life for mobile station 12.

TCP/IP stack 124 offers a standard base for mobile station 12 and may be part of operating system 112. 802.11 shim 122 is a driver that understands how to remove and add header information for incoming and outgoing data. System services element 100 is an abstraction object that runs on top of operating system 112. System services element 100 may include any number of drivers based on particular communications needs. In the present example embodiment, system services element 100 includes virtual WLAN driver 108 and virtual GSM driver 104.

Functions element 90 includes a number elements that offer the intelligence utilized to ensure proper execution of numerous tasks to be performed by mobile station 12. For example, issues relating to power management, Wi-Fi traffic, and cell environment may be addressed by intelligence element 94. Other issues such as roaming and scanning may be addressed by WLAN element operations 92. Signal strength parameters and synchronization may also be addressed by functions element 90. Both layer-two and layer three roaming (e.g. identifying potential access points and authentication schemes) may also be readily accommodated with these elements. Intelligence element 94 may also include objects to address Wi-Fi protected access. Wi-Fi protected access activities may be coordinated with security policies already defined for a given profile of an end user. Wireless multi-media extension (WME) operations may also be accommodated by intelligence element 94. WME operations may be part of QoS parameters and achieve certain power saving benefits. Numerous other elements, software, APIs, ASICs, modules, hardware and components may be added to mobile station 12 in order to achieve any desired functionality. Such additions may account for protocols, security and bandwidth parameters, rate plan information, or any other attribute or characteristic associated with a communication session that implicates mobile station 12. FIG. 2 offers just one of a myriad of potential arrangements or configurations of mobile station 12 in order to achieve the dual-functionality in executing tasks and operations provided by both a private and a public network.

Figure 3:
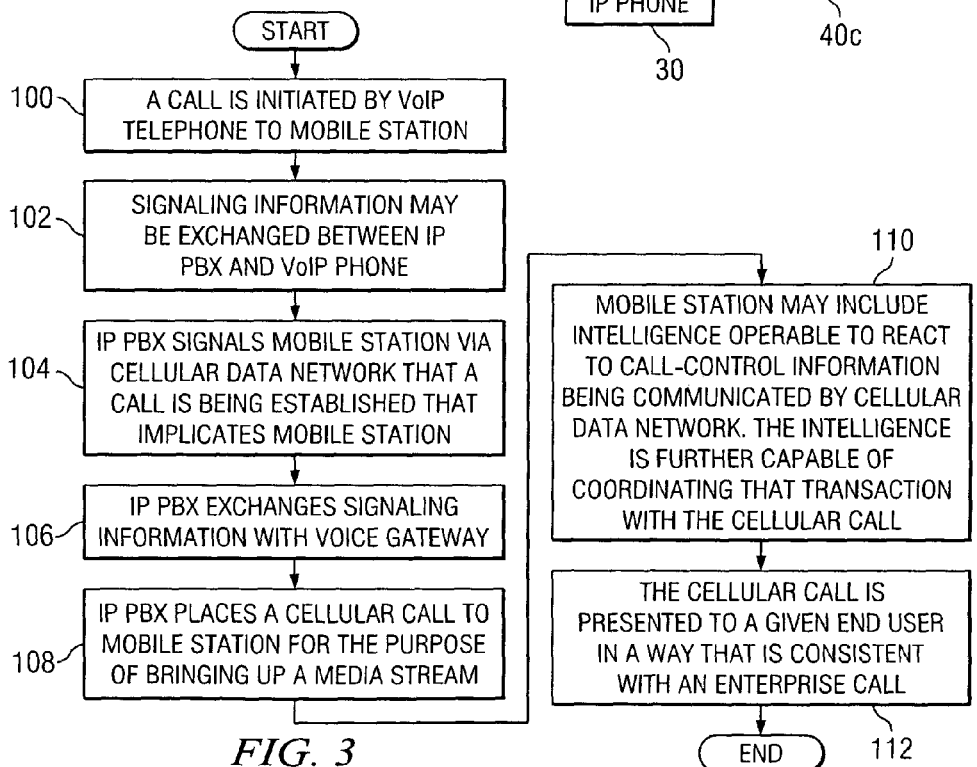
FIG. 3 is a flowchart illustrating a series of example steps associated with a method for delivering private network features in a public network.

FIG. 3 is a simplified flowchart illustrating a series of example steps associated with a method for delivering private network features in a public network. The method may begin at step 100 where a call may be initiated by VoIP telephone 30 to mobile station 12. At step 102, signaling information may be exchanged over a link that couples IP PBX 26 and VoIP phone 30. IP PBX 26 includes intelligence capable of recognizing that a call is being set up that involves mobile station 12 having enhanced capabilities such that it can successfully realize the benefits of services and features provided in a public network and a private network.

At step 104, IP PBX 26 may signal mobile station 12, via cellular data network 20, that a call is being established that implicates mobile station 12. Accordingly, signaling information (e.g. call-control information) may be exchanged between IP PBX 26 and mobile station 12 via cellular data network 20 such that cellular data network 20 can readily accommodate the communication session. IP PBX 26 may also send caller-identification information to mobile station 12 via cellular data network 20 or, alternatively, IP PBX 26 may send any other suitable enterprise data sought to be passed through to cellular data network 20. Thus, IP PBX 26 establishes a data connection to mobile station 12 using cellular data network 20.

As the signaling information is being exchanged between IP PBX 26 and mobile station 12, IP PBX 26 may also exchange signaling information with voice gateway 32 at step 106. Thus, voice circuits (i.e. a voice pathway for voice data to be exchanged between mobile station 12 and a given communication device in the private network) are established between voice gateway 32 and MSC 16 over communications link 40b.

After the call-control path has been established or the call-control transaction has been completed, at step 108, IP PBX 26 may place a cellular call to mobile station 12 for the purpose of bringing up a media stream. Mobile station 12 includes intelligence operable to react to call-control information being communicated by cellular data network 20. The intelligence is further capable of coordinating that transaction with the cellular call at step 110. In a general sense, this allows mobile station 12 to realize the benefits of operating in both a private and a public network by effectively managing data exchanges and signaling information associated with the communication session.

The cellular call may be presented to a given end user in a way that is consistent with an enterprise call at step 112. This achieves the benefits of both public and private network environments. For example, once a call has been established a given end user of VoIP phone 30 can invoke a conference call feature. The initiation of the conference call functionality may be communicated to IP PBX 26, which again may be able to recognize that this communication session implicates mobile station 12, having enhanced capabilities to realize operational functions in both private and public networks. IP PBX 26 may again exchange call-control signaling with mobile station 12 via cellular data network 20. Cellular data network 20 may signal (or "ping") the user interface of mobile station 12 in order to place mobile station 12 into a conference call mode. The conference call mode may be consistent with the user interface that is available in the enterprise network.

In operation of the reverse direction (again offered for purposes of example and teaching only), mobile station 12 may initiate a directory functionality by depressing a given key provided thereon or by scrolling through a menu and selecting a provided option. The selection/request may propagate to cellular data network 20. IP PBX 26 could then invoke the directory functionality and, for example, deliver a list of company names and extensions to an end user of mobile station 12. IP PBX 26 may then remain responsible for managing the media that is consistent with the media-handling capabilities as provided in the VoIP network.

Some of the steps illustrated in FIG. 3 may be changed or deleted where appropriate and additional steps may also be added to the flowchart. These changes may be based on specific communication architectures or particular interfacing arrangements and configurations of associated elements and do not depart from the scope or the teachings of the present invention. It is important to recognize that FIG. 3 illustrates just one of a myriad of potential implementations of communication system 10.

Although the present invention has been described in detail with reference to particular embodiments, it should be understood that various other changes, substitutions, and alterations may be made hereto without departing from the spirit and scope of the present invention. For example, although the present invention has been described with reference to certain steps and tasks to be performed to establish a signaling and a voice pathway, these steps may be altered considerably. Communication system 10 is malleable in that any number of processes or procedures may be executed in order to achieve the dual-functionality as described herein. The example scenarios and configurations have been offered for discussion purposes only and accordingly should be construed as such.

Moreover, although the present invention has been described with reference to a number of elements included within communication system 10, these elements may be rearranged or positioned in any appropriate manner to accommodate any suitable routing configurations. In addition, any of the elements of FIGS. 1 and 2 may be provided as separate external components to communication system 10 or to each other where appropriate. For example, any of the enhanced functionalities of voice gateway 32, IP PBX 26, or mobile station 12 may be provided external thereto in a single module or component that is operable to execute their operations as identified herein. The present invention contemplates great flexibility in the arrangement of these elements as well as their internal structure.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for delivering one or more features in a network environment, comprising:

an Internet protocol (IP) private branch exchange (PBX) operable to receive a request from selected one of a communication device and a mobile station, the request being used to establish a communication session that implicates the mobile station, the IP PBX responding to the request by signaling to a cellular data network that a call is being initiated that involves the mobile station, wherein the IP PBX is operable to exchange signaling information with a voice gateway after receiving the request such that one or more voice circuits are established by the voice gateway in order to accommodate voice data that may propagate between the communication device and the mobile station, and wherein a signaling pathway is established between the IP PBX and the mobile station via the cellular data network in response to the request, the establishment of the signaling pathway being substantially concurrent with the establishment of one or more of the voice circuits such that one or more features associated with a private network are delivered to the mobile station during the communication session, the mobile station being coupled to a first pathway, which is used for signaling data, and a second pathway, which is different from the first pathway and which is used for voice data, the features being enabled by a feature server that is coupled to the IP PBX and that is operable to deliver the features to the mobile station in real-time.

2. The apparatus of claim 1, wherein the IP PBX and the communication device exchange signaling information associated with the communication session after the request is received by the IP PBX.

3. The apparatus of claim 1, wherein the IP PBX communicates call-identification information to the mobile station after receiving the request from the communication device.

4. The apparatus of claim 1, wherein signaling information associated with one or more functions performed at the mobile station and involving one or more of the features associated with the private network are received by the IP PBX and processed therein during the communication session.

5. The apparatus of claim 1, wherein the communication session is presented to an end user of the mobile station in a manner that is consistent with a display, which may be offered in the private network.

6. The apparatus of claim 1, wherein the IP PBX is capable of identifying that the mobile station is equipped to accommodate one or more of the features associated with the private network and one or more of the features associated with the cellular data network.

7. The apparatus of claim 1, wherein the one or more of the features associated with the private network are a selected one of a group of elements consisting of:

a) a "hold" function;
b) a conference call function;
c) a mute function;
d) a voice mail function;
e) a do not disturb function;
f) a message alert function;
g) a three-way call function;
h) a call forwarding function;
i) a call waiting function; and
j) a directory function.

8. An apparatus for delivering one or more features in a network environment, comprising:

a mobile station operable to conduct a communication session involving a communication device, an Internet protocol (IP) private branch exchange (PBX) being operable to receive a request from a selected one of the communication device and the mobile station to establish the communication session, the IP PBX responding to the request by signaling to the mobile station via a cellular data network that a call is being initiated that involves the mobile station, wherein the IP PBX is operable to exchange signaling information with a voice gateway after receiving the request such that one or more voice circuits are established by the voice gateway in order to accommodate voice data that may propagate between the communication device and the mobile station, and wherein a signaling pathway is established between the IP PBX and the mobile station via the cellular data network in response to the request, the establishment of the signaling pathway being substantially concurrent with the establishment of one or more of the voice circuits such that one or more features associated with a private network are delivered to the mobile station during the communication session, the mobile station being coupled to a first pathway, which is used for signaling data, and a second pathway, which is different from the first pathway and which is used for voice data, the features being enabled by a feature server that is coupled to the IP PBX and that is operable to deliver the features to the mobile station in real-time.

9. The apparatus of claim 8, wherein the mobile station includes an operations/administration (OA) and management/policies (MP) element operable to provide provisioning applications for the mobile station, the provisioning applications being associated with one or more policies provided to an end user of the mobile station.

10. The apparatus of claim 8, wherein the mobile station includes a general module that is operable to provide a communicative platform from which one or more of the features associated with the private network are delivered.

11. The apparatus of claim 8, wherein signaling information associated with one or more functions performed at the mobile station and involving one or more of the features associated with the private network are received by the IP PBX and processed therein during the communication session.

12. The apparatus of claim 8, wherein the mobile station includes a functions element operable to perform scanning and roaming functionalities for the mobile station.

13. The apparatus of claim 12, wherein the functions element is further operable to provide power management and wireless local area network (WLAN) operations for the mobile station.

14. The apparatus of claim 12, wherein the mobile station includes one or more virtual drivers operable to communicate with the functions element in order to facilitate a selected communications protocol being implemented in the communication session.

15. A method for delivering one or more features in a network environment, comprising:

receiving a request from a selected one of a communication device and a mobile station to establish a communication session that involves the mobile station;

responding to the request by signaling to the mobile station via a cellular data network that a call is being initiated that involves the mobile station;

exchanging signaling information with a voice gateway after receiving the request such that one or more voice circuits are established by the voice gateway in order to accommodate voice data that may propagate between the communication device and the mobile station; and establishing a signaling pathway between an Internet protocol (IP) private branch exchange (PBX) and the mobile station via the cellular data network in response to the request, wherein the establishment of the signaling pathway is substantially concurrent with the establishment of one or more of the voice circuits such that one or more features associated with a private network are delivered to the mobile station during the communication session, the mobile station being coupled to a first pathway, which is used for signaling data, and a second pathway, which is different from the first pathway and which is used for voice data, the features being enabled by a feature server that is coupled to the IP PBX and that is operable to deliver the features to the mobile station in real-time.

16. The method of claim 15, further comprising:
exchanging signaling information between the IP PBX and the communication device after the request is received by the IP PBX.

17. The method of claim 15, further comprising:
communicating call-identification information to the mobile station via the cellular data network after the request from the communication device is received.

18. The method of claim 15, further comprising:
processing signaling information associated with one or more functions performed at the mobile station and involving one or more of the features associated with the private network at the IP PBX during the communication session.

19. The method of claim 15, further comprising:
presenting the communication session to an end user of the mobile station in a manner that is consistent with a display which may be offered in the private network.

20. The method of claim 15, further comprising:
identifying that the mobile station is equipped to accommodate one or more of the features associated with the private network and one or more of the features associated with the cellular data network after the request is received.

21. A system for delivering one or more features in a network environment, comprising:
means for receiving a request from selected one of a communication device and a mobile station to establish a communication session associated with the mobile station;

means for responding to the request by signaling to the mobile station via a cellular data network that a call is being initiated that involves the mobile station;

means for exchanging signaling information with a voice gateway after receiving the request such that one or more voice circuits are established by the voice gateway in order to accommodate voice data that may propagate between the communication device and the mobile station; and means for establishing a signaling pathway coupled to the cellular data network in response to the request, wherein the establishment of the signaling pathway is substantially concurrent with the establishment of one or more of the voice circuits such that one or more features associated with a private network are delivered to the mobile station during the communication session, the mobile station being coupled to a first pathway, which is used for signaling data, and a second pathway, which is different from the first pathway and which is used for voice data, the features being enabled by a feature server that is coupled to the IP PBX and that is operable to deliver the features to the mobile station in real-time.

22. The system of claim 21, further comprising:
means for exchanging signaling information via the communication device after the request is received.

23. The system of claim 21, further comprising:
means for communicating call-identification information to the mobile station via the cellular data network after the request from the communication device is received.

24. The system of claim 21, further comprising:
means for processing signaling information associated with one or more functions performed at the mobile station and involving one or more of the features associated with the private network during the communication session.

25. The system of claim 21, further comprising:
means for presenting the communication session to an end user of the mobile station in a manner that is consistent with a display which may be offered in the private network.

26. The system of claim 21, further comprising:
means for identifying that the mobile station is equipped to accommodate one or more of the features associated with the private network and one or more of the features associated with the cellular data network after the request is received.

27. Software for delivering one or more features in a network environment, the software being embodied in a computer readable medium and comprising computer code such that when executed is operable to:
receive a request from a selected one of a communication device and a mobile station to establish a communication session that involves the mobile station;

respond to the request by signaling to the mobile station via a cellular data network that a call is being initiated that involves the mobile station;

exchange signaling information with a voice gateway after receiving the request such that one or more voice circuits are established by the voice gateway in order to accommodate voice data that may propagate between the communication device and the mobile station; and establish a signaling pathway via the cellular data network in response to the request, wherein the establishment of the signaling pathway is substantially concurrent with the establishment of one or more of the voice circuits such that one or more features associated with a private network are delivered to the mobile station during the communication session, the mobile station being coupled to a first pathway, which is used for signaling data, and a second pathway, which is different from the first pathway and which is used for voice data, the features being enabled by a feature server that is coupled to the IP PBX and that is operable to deliver the features to the mobile station in real-time.

28. The medium of claim 27, wherein the code is further operable to:
  exchange signaling information via the communication device after the request is received.

29. The medium of claim 27, wherein the code is further operable to:
  communicate call-identification information to the mobile station via the cellular data network after the request from the communication device is received.

30. The medium of claim 27, wherein the code is further operable to:
  process signaling information associated with one or more functions performed at the mobile station and involving one or more of the features associated with the private network during the communication session.

31. The medium of claim 27, wherein the code is further operable to:
  present the communication session to an end user of the mobile station in a manner that is consistent with a display which may be offered in the private network.

32. The medium of claim 27, wherein the code is further operable to:
  identify that the mobile station is equipped to accommodate one or more of the features associated with the private network and one or more of the features associated with the cellular data network after the request is received.

* * * * *